May 16, 1933.  C. D. PETERSON  1,909,889
GEAR SHIFTING MECHANISM
Filed Jan. 15, 1932  4 Sheets-Sheet 3
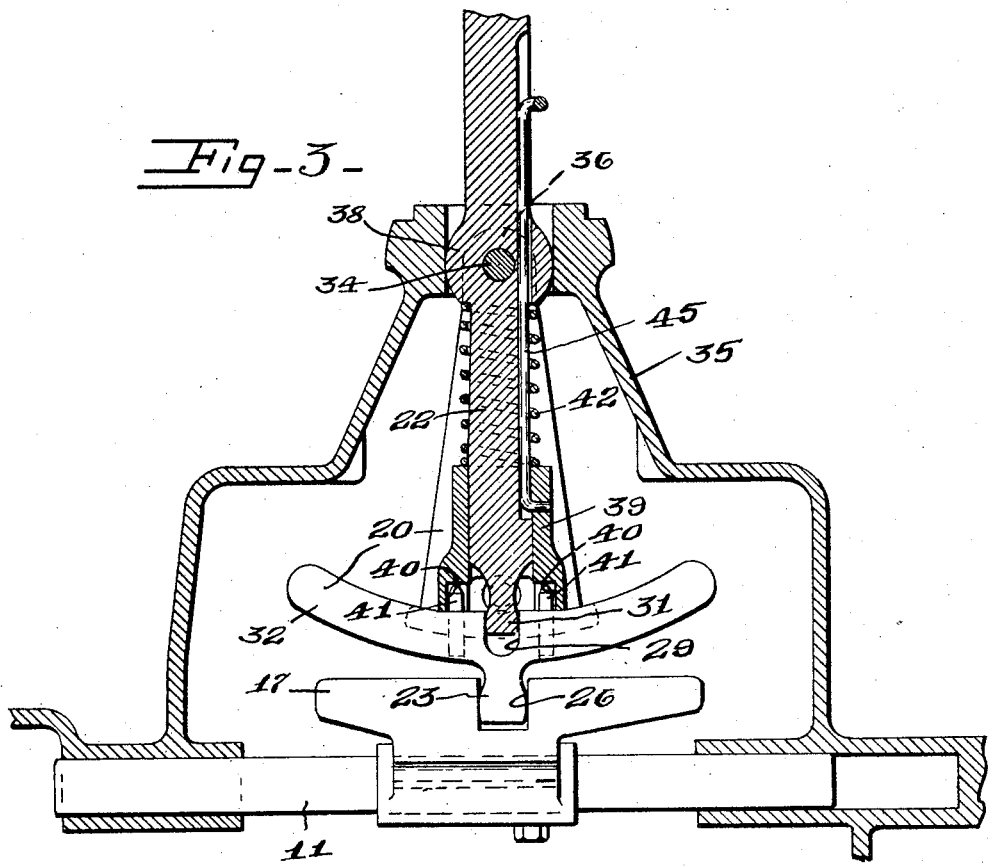
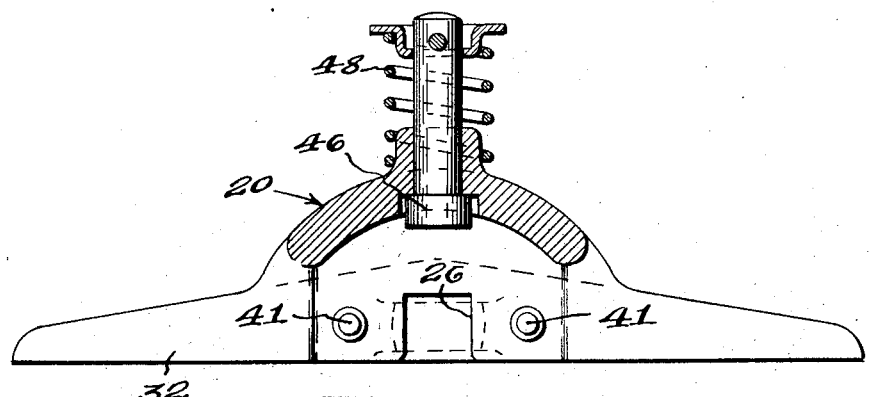
INVENTOR
Carl D. Peterson
BY
Birdell & Thompson
ATTORNEYS.

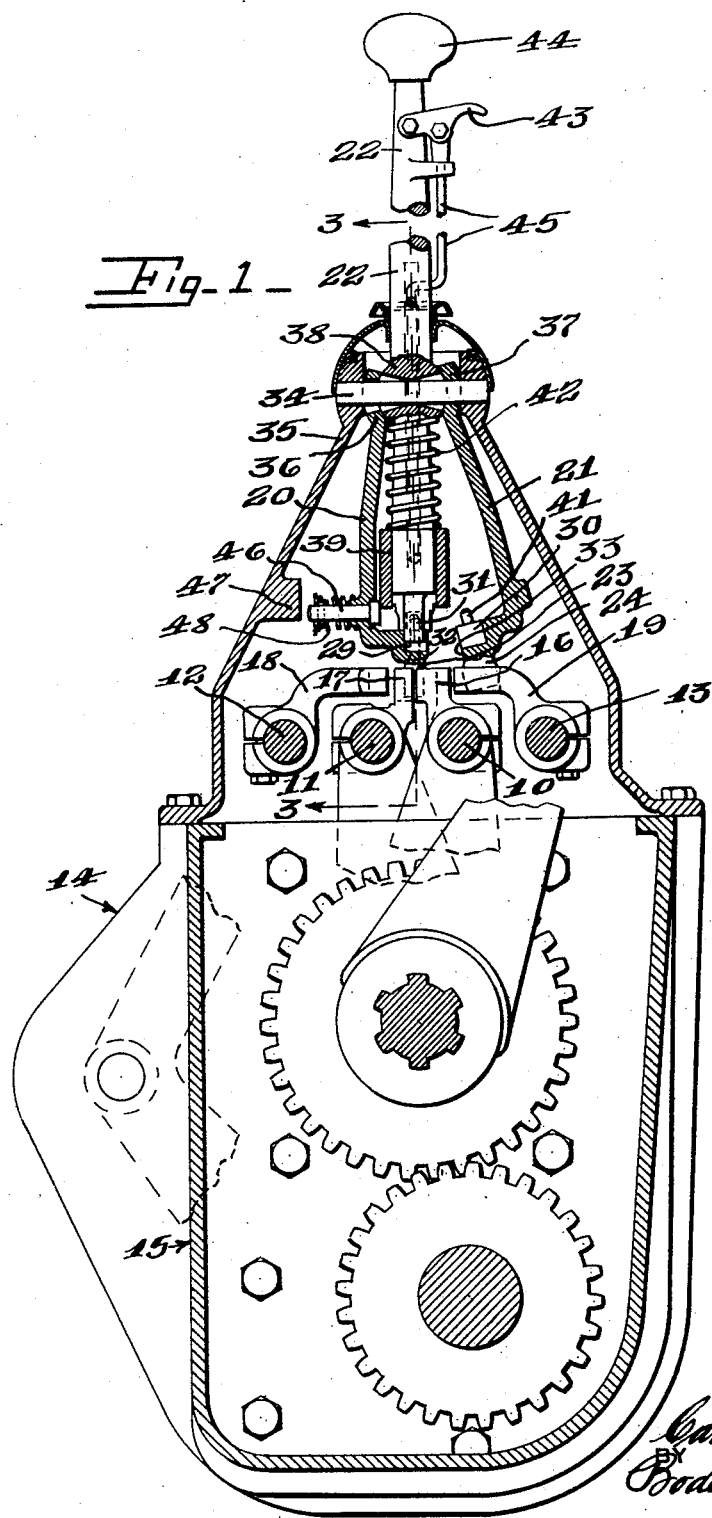

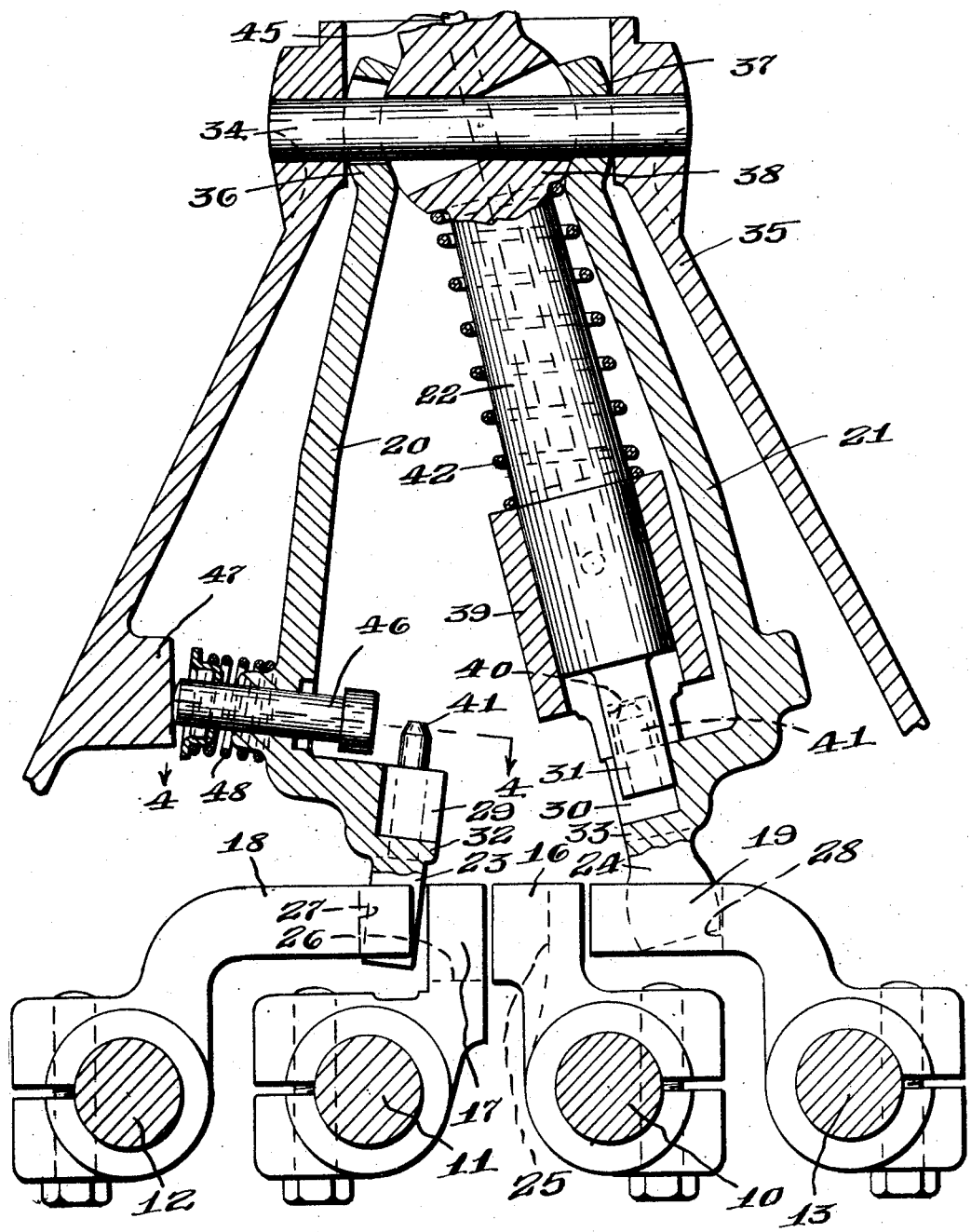

May 16, 1933.　　　C. D. PETERSON　　　1,909,889
GEAR SHIFTING MECHANISM
Filed Jan. 15, 1932　　　4 Sheets-Sheet 4
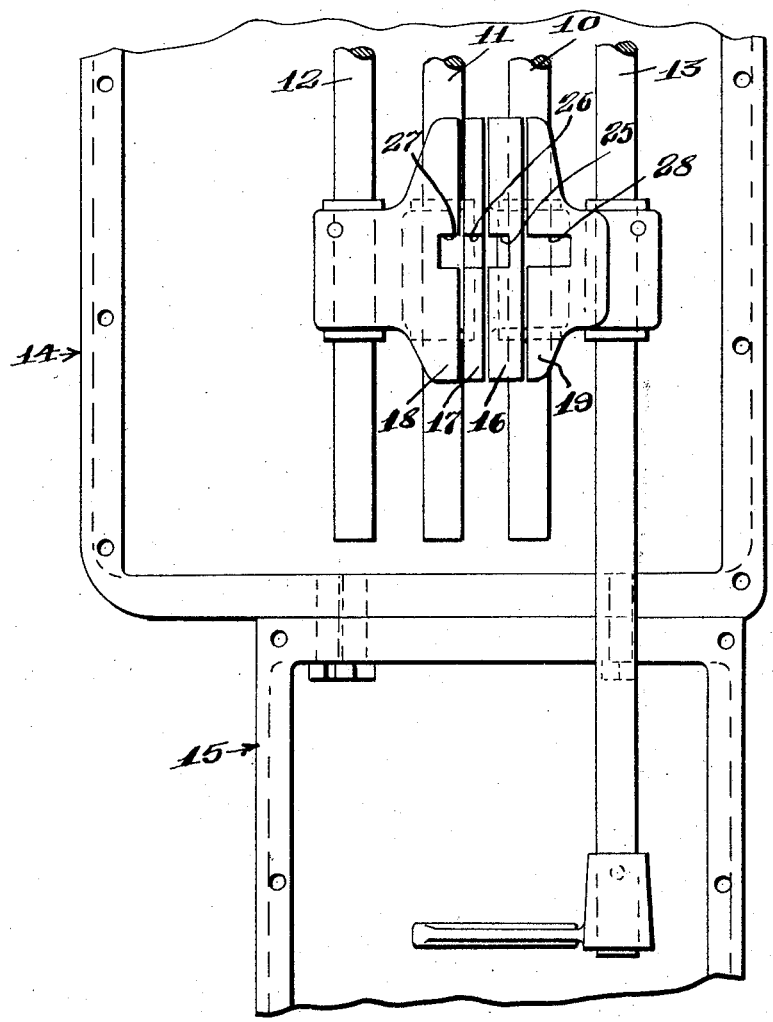
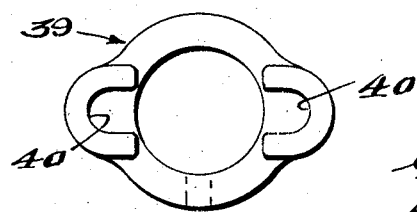
INVENTOR
Carl D. Peterson
BY
Rodell & Thompson
ATTORNEYS.

Patented May 16, 1933

1,909,889

UNITED STATES PATENT OFFICE

CARL D. PETERSON, OF TOLEDO, OHIO, ASSIGNOR TO SPICER MANUFACTURING CORPORATION, OF TOLEDO, OHIO, A CORPORATION OF VIRGINIA

GEAR SHIFTING MECHANISM

Application filed January 15, 1932. Serial No. 586,820.

This invention relates to shifting mechanisms for selective change speed gearing, and more particularly to a shifting mechanism where a single shifting lever is utilized to first shift one shifter rod into a shifted position from neutral, and then freed from that shifter rod while in shifted position and moved into engagement with another shifter rod to shift it, or in other words, a gear shifting mechanism for a gearing in which there is a main and an auxiliary set of change speed gearing, and the main gear set can be used independently of the auxiliary set, or in conjunction with the auxiliary set, so that the auxiliary set will multiply the number of gear changes that are capable of being made in the main gear set, the gear shifting mechanism including a single shifting lever used to shift the gears of the main set and the auxiliary set.

The invention has for its object, a gear shifting mechanism which is particularly simple and economical in construction and in which the shift rods can be readily selected or found when the main gear shifting lever is being transferred from one shift rod to another, and either or both are in a shifted position in contradistinction to all of them being in neutral position.

The invention consists in the novel features and in the combinations and constructions hereinafter set forth and claimed.

In describing this invention, reference is had to the accompanying drawings in which like characters designate corresponding parts in all the views.

Figure 1 is a transverse sectional view of this gear shifting mechanism, the contiguous portion of the main gear box being also shown, the shifter rods and levers being in neutral position.

Figure 2 is an enlarged, fragmentary, sectional view showing the gear shifting mechanism in one of its operative positions.

Figure 3 is an enlarged, sectional view taken approximately on line 3—3, Figure 1.

Figure 4 is a sectional view taken approximately on line 4—4, Figure 2.

Figure 5 is a fragmentary plan view of a main and auxiliary gear box showing the shifter rods for shifting the gears in the boxes, the gears being omitted.

Figure 6 is an enlarged end view of the locking member on the main gear shifting lever for locking the main lever in engagement with either of the auxiliary levers.

This gear shifting mechanism includes main and auxiliary shifters which are usually shift rods, the main rods effecting gear or clutch shifting operations in a main gear set, and the auxiliary rod effecting changes in an auxiliary gear set, a pair of secondary shifting members which are usually levers for coacting respectively with the rods for the main and auxiliary gear set, a main shifting lever movable laterally to select either one of the pair of levers, and fore and aft to shift the selected lever and thereby shift a selected shift rod, said mechanism may further include a locking member carried by the main shifting lever and having means for interlocking with either one of the pair of levers and operable out of interlocking engagement while that one of the pair of levers is in either its neutral or shifted position, and shiftable into interlocking engagement with the other lever when in its neutral or in any shifted position. By reason of the locking member, the main shifting lever can be interlocked with either secondary lever and freed of either secondary lever at any time for the purpose of shifting it into engagement with the other lever in any position of the other lever.

In the illustrated embodiment of my invention, a gear shifting mechanism having three main shift rods is shown for shifting the gears in the main gear box, and one auxiliary shift rod for making speed changes in a gear set in an auxiliary gear box.

10, 11 and 12 designate respectively, the main shifters or rods, and 13, the auxiliary rod, the rods 10, 11 and 12 effecting gear changes in a gear set located in a box 14, and an auxiliary rod 13 effecting gear changes in an auxiliary set usually located in a box 15 mounted at the rear end of the box 14. The construction of the change speed gearing forms no part of this invention, and the invention lies in the shifting mechanism. The rods are provided respectively with the usual blocks 16, 17, 18 and 19 with which the shifting levers coact. The rods also have the usual forks for coacting with the gears or elements to be shifted.

20 and 21 designate respectively, the secondary levers for coacting respectively with the rods 10, 11, and 12, and the rod 13, or the shifter blocks thereof, these levers being mounted to have a fore and aft swinging movement, and the lever 20 having also a lateral selecting movement because it coacts with a plurality of rods 10, 11, 12. The lever 21, in this embodiment of my invention, has no lateral selecting movement as it shifts the one rod 13.

22 designates the manually operable main gear shifting lever having an arm extending between the secondary levers 20 and 21 and mounted to have a lateral movement into selective engagement with either one of the secondary levers 20 or 21, and a fore and aft movement to shift the selected lever. The lateral movement of the lever 22 in one direction also effects a lateral selecting movement of the secondary lever 20 into selective engagement with any one of the rods 10, 11, or 12.

Each of the secondary levers 20 and 21 is provided with a finger 23 or 24 for coacting with passages or notches 25, 26, 27, in the blocks of the rods 10, 11, and 12, or with the notch 28 in the block of the auxiliary shift rod 13. Each of the levers 20 and 21 is also provided with a passage or gate 29 or 30 for receiving a finger 31 at the lower end of the lever 22. The passages or notches 25, 26, 27 and 28, are arranged in alinement when all the gears are in neutral position, and all the notches 25, 26 and 27 must be arranged in neutral position before a shift can be made from any one rod 10, 11 or 12 to another, as in the usual selective change speed transmission gearing. However, a shift can be made at any time regardless of the positions of the levers 20 and 21 to engage the finger 31 at the lower end of the lever 22 in either of the gates 29 and 30. In order to facilitate the shifting of the lever 22 into engagement with either lever 20 or 21, these levers are provided respectively with guides 32 and 33 extending in a general direction lengthwise of the rods, or of the fore and aft movement of the lever 22, and the gates 29 and 30 interrupt or open through the faces of these guides. As the levers 20, 21 and 22 are mounted coaxially, these guides are arc shaped with the center of the arc at the axis of the lever.

The lever 22 is pivoted in the usual manner on a pivot pin 34 at the upper end of a support or housing 35, this support being usually termed a tower, and is provided on the cap of the gear box 14. The lever is fulcrumed on its pivot to have a rocking movement in two directions about intersecting axes at a right angle to each other, that is to have a lateral selecting pivotal movement, and a fore and aft shifting movement. The levers 20 and 21 are also mounted to swing about the pivot 34 and are provided with sockets 36, 37 coacting with opposite sides of a ball 38 on the lever 22 having its center at the intersection of the two axes of the lever 22.

39 designates a locking member mounted on the lever 22 between the levers 20 and 21, and having means for interlocking with either of the levers 20 and 21. This locking member is here shown as a sleeve slidable on the lower end of the lever 22 above the finger 31, and as having means, as sockets 40, for receiving shoulders or pins 41 on the levers 20 and 21, these pins being preferably located on opposite sides of the gates 29, 30, there being a pin on each side of each gate so that the locking member when interlocked with either lever 20 or 21 is arranged astride the gate 29 or 30 of that lever. The locking member or sleeve 39 is pressed into its locking engagement by a spring 42, and is manually operated against the action of the spring by a finger, or a grip lever 43 pivoted to the lever 22 adjacent the handle 44 thereof and connected by a link 45 to the sleeve 39. The guides 32, 33 are inserted relatively to the levers 20, 21 providing shelves from which the pins 41 project upwardly.

The rod 12 effects reverse speed, and in transmission gearings, means is usually provided for preventing unintentional selection of the reverse speed rod, by requiring the driver to make a conscious effort to select the reverse speed rod, and in this embodiment of my invention, the sleeve 39 is utilized as part of such means. This means includes a spring pressed barrier 46, here shown as in the form of a plunger extending through the lever 20, which, as before described, is shiftable into engagement with the block 18 of the reverse shifting rod 12, the plunger being arranged to strike a shoulder 47 in the housing, or tower 35 when the lever 20 is shifted laterally toward the rod 12 so that further movement of the lever 20 pushes the plunger 46 inwardly relatively to the lever 20 against the action of a returning spring 48, and the head of the plunger 46 thrusts against the locking member 39 and therefore, prevents further shifting of the lever 22 sufficiently to carry the finger 23 into engagement with the notch 27 of the block 18 of the reverse shifter rod 12. Hence, in order to get into reverse gear, it is necessary to lift the locking member or sleeve 39 until its lower end clears or passes above the head of the plunger 46. This movement however, is not sufficient to disengage the sockets 40 from the pins 41 or if the operator does move the finger lever 43 sufficiently to disengage the sockets 40 from the pins 41, the sleeve 39 will move downwardly sufficiently to engage the sockets and the pins when the finger lever is released after the lever 20 has been shifted laterally far enough to engage its finger 23 in the notch 27 of the reverse shifter rod 12.

In operation, when the gears in the main gear box 14 only are being used, the shift rod 13 is in starting position, and when in this position, the gears in the auxiliary gear box idle and the motion is transmitted without modification through any one of the gear changes in the gear box 14. Hence, the gear shifting lever 22 is operated to select and shift any one of the rods 10, 11 and 12 in the usual manner. As before stated, the rod 12 produces reverse gear. The rod 10 produces first and second gear, and the rod 11 third and fourth, the latter being high gear. When either one of the rods 10, 11 and 12 is in one of its shifted positions, the shifting lever 22 can be disengaged therefrom by operating the finger lever 43 to shift the locking member 39 upwardly far enough to disengage it from the pins 41. The lever can then be shifted laterally out of the gate 29, that is, freed of the lever 20, and shifted fore and aft until the finger 31 finds the gate 30, and then the finger lever 43 released to permit the locking member or sleeve 39 to interlock with the pins 41 of the lever 21, whereupon the rod 13 can be shifted so that the motion transmitted by any of the gear changes in the main gear box 14 is modified by the gears in the auxiliary box 15 effected by the shifting of the rod 13 from neutral position. The guides 32, 33 facilitate the hunting and finding of the gate 29 or 30. Also, if any overdrive or underdrive speeds effected by the gears in the auxiliary box 15 are to be discontinued, the operator shifts the lever 21 back to neutral. It is understood that the main, or engine clutch must be thrown off during gear shifting operations in the usual manner.

It is obvious that by this gear shifting mechanism, the speed changes can be made in the main gear box through a plurality of shift rods in the usual manner, and also, any auxiliary gear changes made through the shift rod 13 effected with the same gear shifting lever, and that owing to the guides 32, 33 and the gates opening therethrough, the operator can readily find the shift rod to be shifted regardless of whether it is in neutral or any shifted position.

What I claim is:

1. In a shifting mechanism for selective change speed gearing, the combination with shift rods, of a pair of shifting members for coacting with said rods to shift the same, a shifting lever common to both shifting members, and having a lateral selecting movement in opposite directions from a neutral position into interlocking engagement with either one of the shifting members, and a fore and aft movement to shift the selected member, and locking means carried by the shifting lever to lock the lever and selected member together, and operable to release the shifting lever from the selected member when in starting and in shifted position, whereby the shifting lever may be shifted into engagement with the other shifting member while the first shifting member is in any shifted position.

2. In a shifting mechanism for selective change speed gearing, the combination with shift rods, of a pair of shifting members for coacting with said rods to shift the same, a shifting lever common to both shifting members, and having a lateral selecting movement in opposite directions from a neutral position into interlocking engagement with either one of the shifting members, and a fore and aft movement to shift the selected member, and locking means carried by the shifting lever to lock the lever and the selected member together, and operable to release the shifting lever from the selected member when in any position, whereby the shifting lever may be shifted into engagement with the other shifting member to shift the same while the first shifting member is in any position, the shifting members having guides extending in the direction of the fore and aft movement of the shifting lever between which guides the shifting lever travels during its fore and aft movement.

3. In a shifting mechanism for selective change speed gearing, the combination with shift rods, of a pair of shifting members for coacting with said rods to shift the same, a shifting lever common to both shifting members, and having a lateral selecting movement in opposite directions into interlocking engagement with either one of the shifting members, and a fore and aft movement to shift the selected member, and locking means carried by the shifting lever to lock the lever and the selected member together and operable to release the shifting lever from the selected member when in any position, whereby the shifting lever may be shifted into engagement with the other shifting member to shift the same while the first shifting member is in any position, the shifting member having guides extending in the direction of the fore and aft movement of the lever between which guides the shifting lever travels during its fore and aft movement, each guide being formed with a gate, and the shifting lever having a finger for entering the gate into interlocking engagement with the selected shifting member.

4. In a shifting mechanism for selective change speed gearing, the combination with shift rods, of a pair of shifting levers for coacting with said rods to shift the same, and a main shifting lever extending between the former levers, and having a lateral selecting movement in opposite directions into interlocking engagement with either one of the former levers, and a fore and aft movement to shift the selected lever, a support for the levers, the main lever being fulcrumed in the support to have a pivotal movement in two directions about two intersecting axes at a right angle to each other, and provided with ball surfaces having their centers at the intersection of the axes, and the pair of levers having sockets coacting with the ball surfaces.

5. In a shifting mechanism for selective change speed gearing, the combination with shift rods, of a pair of shifting levers for coacting with said rods to shift the same and a main shifting lever extending between the pair of levers and having a lateral selecting movement in opposite directions into interlocking engagement with either of the former levers, and a fore and aft movement to shift the selected lever, the pair of levers having guides extending in a direction lengthwise of the rods on opposite sides of the main lever, and with gates opening through the opposing side faces of the guides, and the main lever having a finger movable along the guides and selectively into the gates.

6. In a shifting mechanism for selective change speed gearing, the combination with shift rods, of a pair of shifting levers for coacting with said rods to shift the same, a main shifting lever extending between the pair of levers and having a lateral selecting movement in opposite directions into interlocking engagement with either of the former levers, and a fore and aft movement to shift the selected lever, the pair of levers having guides extending in a direction lengthwise of the rods on opposite sides of the main lever, and with gates opening through the opposing side faces of the guides, the main lever having a finger movable selectively during the lateral shifting of the main lever into interlocking engagement with either of the pair of levers, a spring pressed locking member movable lengthwise of the main lever and having means for interlocking with either one of the pair of levers when the main lever is in interlocking engagement therewith, and means for shifting the locking member against the action of its spring.

7. In a shifting mechanism for selective change speed gearing, the combination with shift rods, of a pair of shifting levers for coacting with said rods to shift the same, a main shifting lever extending between the pair of levers and having a lateral selecting movement in opposite directions into interlocking engagement with either of the former levers, and a fore and aft movement to shift the selected lever, the pair of levers having guides extending in a direction lengthwise of the rods on opposite sides of the main lever, and with gates opening through the opposing side faces of the guides, the main lever having a finger movable selectively during the lateral shifting of the main lever into interlocking engagement with either of the pair of levers, a spring pressed locking member movable lengthwise of the main lever and having means for interlocking with either one of the pair of levers when the main lever is in interlocking engagement therewith, the locking member and each of the pair of levers having means for interlocking located in front of and in rear of the gate.

8. In a shifting mechanism for selective change speed transmitting gearing, the combination with main and auxiliary shifters, of a main shifting member and secondary shifting members arranged on opposite sides of the main member, the main member being a lever having a lateral selecting movement into engagement with either of the secondary members and a fore and aft movement to shift the selected member and the secondary members coacting with the main and auxiliary shifters respectively and one of them having a lateral selecting movement into engagement with any one of the main shifters and a fore and aft movement to shift the selected shifter and the other auxiliary shifting member being normally engaged with the auxiliary shifter and having a fore and aft movement.

9. In a shifting mechanism for selective change speed gearing, the combination with a set of main shifter rods and an auxiliary shifter rod; of a main shifting lever and secondary shifting levers arranged on opposite sides of the main lever and coacting with the set of main shifter rods and the auxiliary shifter rod respectively, the main lever having a lateral selecting movement into engagement with either of the secondary levers and a fore and aft movement to shift the selected secondary lever, the secondary lever which coacts with the main shifter rods having a lateral selecting movement and a fore and aft movement and the secondary lever which coacts with the auxiliary shifter rod being interlocked therewith and having a fore and aft movement, each secondary lever having a forwardly and rearwardly extending guide and a passage opening through the face of the guide providing a gate for the main shifting lever and the main shifting lever having a finger for moving along the guides and entering the gate.

10. In a shifting mechanism for selective change speed gearing, the combination with a set of main shifter rods, and an auxiliary shifter rod; of a main shifting lever and secondary shifting levers arranged on opposite sides of the main lever and coacting with the set of main shifter rods and the auxiliary shifter rod respectively, the main lever having a lateral selecting movement into engagement with either of the secondary levers and a fore and aft movement to shift the selected secondary lever, the secondary lever which coacts with the main shifter rods having a lateral selecting movement and a fore and aft movement and the secondary lever which coacts with the auxiliary shifter rod being interlocked therewith and having a fore and aft movement, each secondary lever having forwardly and rearwardly extending guides and a passage opening through the face of the guide providing a gate for the main shifting lever and the main shifting lever having a finger for moving along the guide and entering the gate, a locking member mounted on the main lever the locking member and the secondary levers having means for interlocking to positively interlock the shifting lever with the selected secondary lever and prevent unintentional disengagement of the main and selected secondary lever, and means for operating the locking member.

11. In a shifting mechanism for selective change speed gearing, the combination with a set of main shifter rods and an auxiliary shifter rod; of a main shifting lever and secondary shifting levers arranged on opposite sides of the main lever and coacting with the set of main shifter rods and the auxiliary shifter rod respectively, the main lever having a lateral selecting movement into engagement with either of the secondary levers and a fore and aft movement to shift the selected secondary lever, the secondary lever which coacts with the main shifter rods having a lateral selecting movement and a fore and aft movement and the secondary lever which coacts with the auxiliary shifter rod being interlocked therewith and having a fore and aft movement, each secondary lever having a forwardly and rearwardly extending guide and a passage opening through the face of the guide providing a gate for the main shifting lever and the main shifting lever having a finger for moving along the guides and entering the gates, said auxiliary levers being mounted coaxially with the main lever.

12. In a shifting mechanism for selective change speed gearing, the combination with a set of main shifter rods and an auxiliary shifter rod; of a main shifting lever and secondary shifting levers arranged on opposite sides of the main lever and coacting with the set of main shifter rods and the auxiliary shifter rod respectively, the main lever having a lateral selecting movement into engagement with either of the secondary levers and a fore and aft movement to shift the selected secondary lever, the secondary lever which coacts with the main shifter rods having a lateral selecting movement and a fore and aft movement and the secondary lever which coacts with the auxiliary shifter rod being interlocked therewith and having a fore and aft movement, each secondary lever having a forwardly and rearwardly extending guide and a passage opening through the face of the guide providing a gate for the main shifting lever and the main shifting lever having a finger for moving along the guides and entering the gate, the main lever having a ball mounted concentric with the center of the fulcrum point and the secondary levers being mounted on the pivot of the main lever and having sockets coacting with the ball.

13. In a shifting mechanism for selective change speed transmission gearing, the combination with a set of main shifter rods and an additional shifter rod; and a main shifting lever and secondary shifting levers arranged on opposite sides of the main lever and coacting respectively with the set of shifter rods and the additional rod, the main lever having a lateral selecting movement into engagement with either the secondary levers and a fore and aft movement to shift the selected lever, the secondary levers being mounted coaxially with the shifting lever, and the secondary lever coacting with the set of shifter rods having a lateral shifting and fore and aft movement, and the other lever, which coacts with the additional rod, having a fore and aft movement, means for locking the main lever in interlocking engagement with either of the secondary levers and means for operating the locking means to permit the main lever to be unshipped from either of the auxiliary levers when in neutral or in any shifted position and to shift it into interlocking engagement with the other secondary lever when in any shifted position.

In testimony whereof, I have hereunto signed my name, at Toledo, in the county of Lucas, and State of Ohio, this 9th day of January, 1932.

CARL D. PETERSON.